Oct. 9, 1923.
F. H. RICKER
BRAKE FOR SELF PROPELLING VEHICLES
Filed Nov. 9, 1922 2 Sheets-Sheet 1
1,470,192
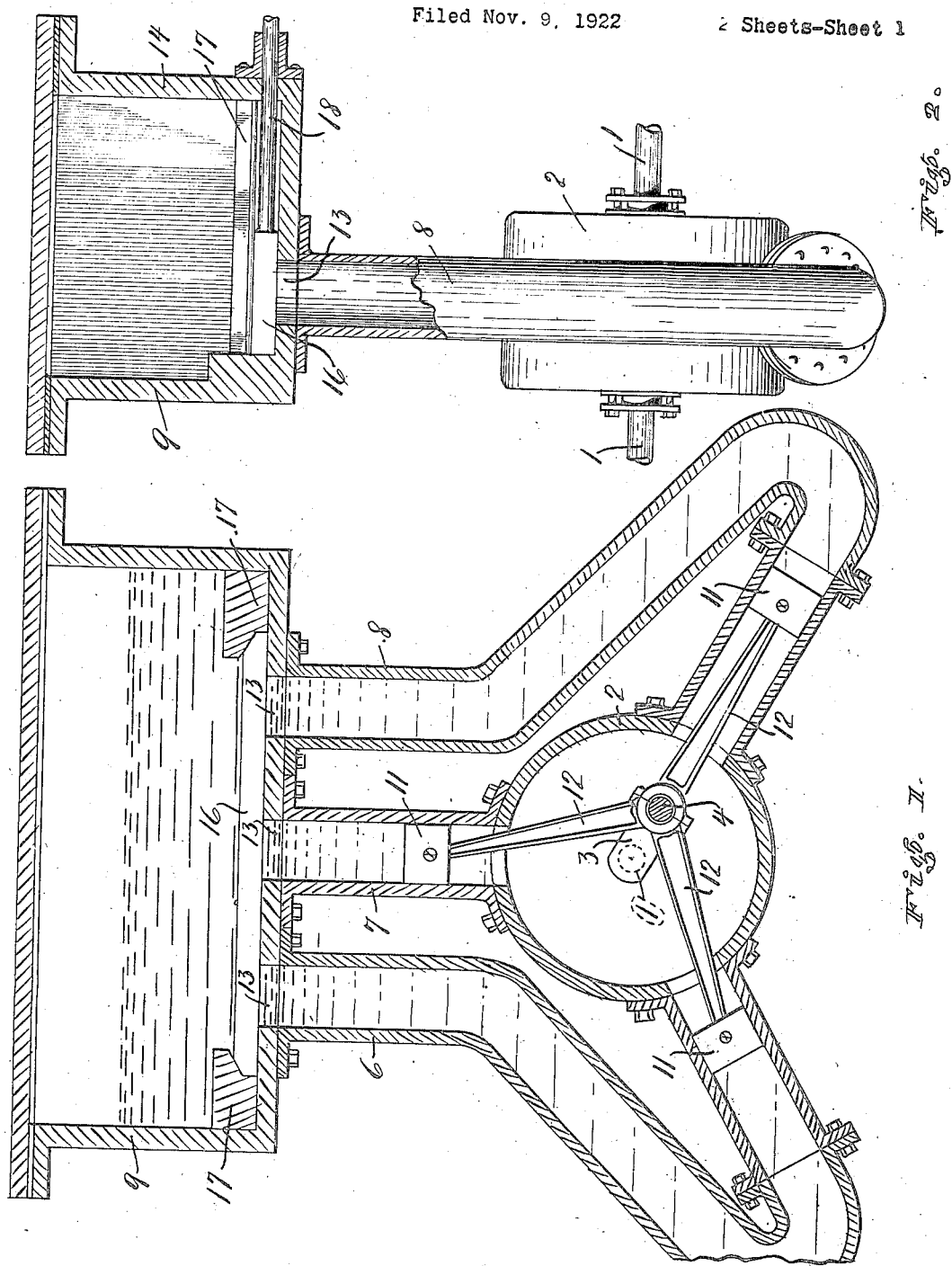
Inventor:
F. H. Ricker
Attorneys.

Oct. 9, 1923.
F. H. RICKER
BRAKE FOR SELF PROPELLING VEHICLES
Filed Nov. 9, 1922   2 Sheets-Sheet 2
1,470,192
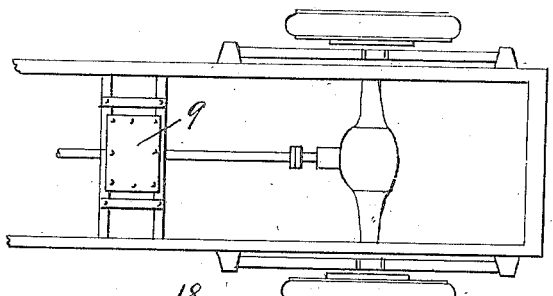
Fig. 3.
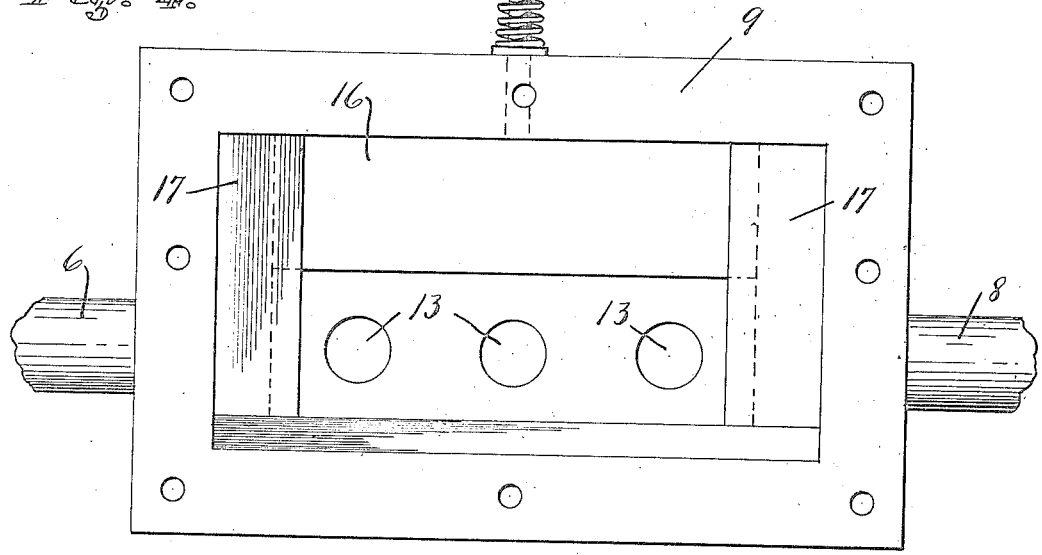
Fig. 4.
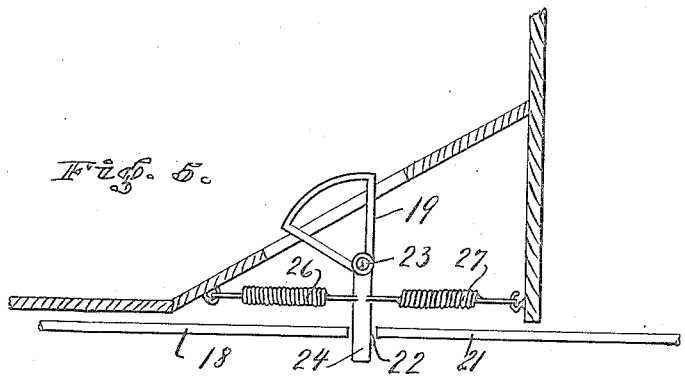
Fig. 5.
Inventor:
F. H. Ricker
Attorneys Patented Oct. 9, 1923.

1,470,192

UNITED STATES PATENT OFFICE.

FLOYD H. RICKER, OF LOS ANGELES, CALIFORNIA.

BRAKE FOR SELF-PROPELLING VEHICLES.

Application filed November 9, 1922. Serial No. 599,874.

*To all whom it may concern:*

Be it known that I, FLOYD H. RICKER, a citizen of the United States, and a resident of Los Angeles, county of Los Angeles, State of California, have invented a new and useful Brake for Self-Propelling Vehicles, of which the following is a specification.

The present invention relates to brakes for self-propelling vehicles or the like and has particular reference to a brake in which pistons are reciprocated in cylinders or tubes by the drive shaft of the motor vehicle and actuate a fluid and in which means are provided for partially or wholly stopping the motion of the fluid whereby the drive shaft is prevented from rotating. The device described in the present application is a modification of the device described in my co-pending application, Serial No. 529-877, the principal distinction being that while in the latter device the pistons were made to cause a fluid medium to circulate which called for a rather complicated pumping mechanism the present device merely causes a column of fluid to reciprocate, eliminating thereby the valves required by the pumping mechanism. It is also proposed to provide in connection with this brake a convenient control for the same which is at the same time adapted to control the throttle valve of the motor vehicle. Further objects and advantages of my device will appear as the specification proceeds.

The preferred form of my invention is illustrated in the accompanying drawing in which Figure 1 shows a transverse section through my brake, Figure 2 a side view of the same, partly in section, Figure 3 a top plan view of the chassis of a motor vehicle having my brake attached thereto, Figure 4 a top plan view of my brake with the cover removed and Figure 5 a detail view of a valve control for the brake and the throttle valve of a motor vehicle. While I have shown only the preferred form of the invention it should be understood that various changes or modifications may be made within the scope of the claims hereto attached without departing from the spirit of the invention.

A portion of the main drive shaft (1) which extends longitudinally from the engine to the rear axle of a motor vehicle is enclosed by a casing (2) which latter is preferably disposed in a place somewhere near the center of the car as indicated in Figure 3. The shaft is broken within the casing to accommodate two cranks (3) between which is supported a crank pin (4). The casing communicates through preferably three tubes (6), (7) and (8) with a receptacle (9) supported above the casing. the tubes are arranged in such a manner that their end portions are disposed radially relative to the axis of the shaft (1) and at equal distance from one another which construction necessitates the bending of the tubes (6) and (8) in the manner shown in Figure 1. Each tube has a piston (11) reciprocating therein and the three pistons are connected with the crank pin (4) by means of suitable connecting rods (12). The receptacle (9) is partly filled with a fluid or pressure medium which is allowed to enter the tubes and to bear against the face of each piston so that as each piston reciprocates in its particular tube a column of fluid reciprocates with the same. It should be observed that due to the particular arrangement of the three tubes the pistons will never occupy the same relative position in each tube since at least one of them must occupy a position different from that of the two others even if the latter two occupy similar positions at certain times.

The three tubes are arranged in the same transverse verticle plane and the ports (13) through which they communicate with the receptacle are aligned and disposed sufficiently far from the front end (14) of the receptacle to allow a sliding valve (16) to reciprocate from an active position shown in Figure 2 in which all the tubes are covered to an inactive position in the front end of the receptacle. The valve is guided between two guide members (17) and is provided with a rod (18) extending through the front end of the receptacle. It will be readily seen that if the valve is pushed over the three tubes into the position shown in Figure 2 it will trap a certain portion of the fluid in at least one of the tubes and prevent the piston in that tube from continuing its outward stroke which of course would prevent the shaft from rotating.

The rod (18) is preferably controlled by the driver of the machine by means of the foot pedal (19). In this connection it might be stated that the same foot pedal can be used at the same time to control the throttle of the engine by means of a second rod (21)

operatively associated with the throttle and supported in longitudinal alignment with the rod (18) in such a manner that a gap (22) is left between the two rods. The foot pedal (19) has preferably the shape of a sector as shown in Figure 5, the apex (23) of which is pivotally supported above the gap while an arm (24) rigidly associated with the sector extends into the gap. Normally the arm (24) is held out of contact with the either rod by suitable springs (26) and (27) which are of equal strength and allow the arm to come to rest in a neutral position within the gap. It is understood that under normal conditions the driver closes the throttle before setting the brake and the control shown in Figure 5 allows the driver to open the throttle by forcing the sector rearward with his foot which advances the rod (21) into driving position. If the driver wishes to stop all he needs to do is to exert a forward pressure on the sector which will automatically close the throttle and set the brake. A spring (28) may be placed around the rod to bear against the receptacle with one end and a collar (29) with the other end tending to normally hold the valve (16) in an inactive position.

I claim:

1. A brake for the drive shaft of a motor vehicle or the like comprising a tube adapted to receive a fluid by gravitation, a piston supporting said fluid having an operative connection with the shaft whereby the piston is reciprocated in the tube when the shaft is rotated and valve means for stopping the reciprocating motion of the fluid so as to prevent the piston from reciprocating and the shaft from rotating.

2. A brake for the drive shaft of a motor vehicle or the like comprising a tube adapted to receive a fluid by gravitation, a piston supporting said fluid having an operative connection with the shaft whereby the piston is reciprocated in the tube when the shaft is rotated and a sliding valve adapted to control the port area of the tube for limiting or preventing the motion of the fluid.

3. A brake for the drive shaft of a motor vehicle or the like comprising a receptacle for a pressure medium, a plurality of tubes extending from said receptacle with their ends arranged radially relative to the shaft, a piston in each tube supporting the pressure medium having an operative connection with the shaft whereby the piston is reciprocated when the shaft is rotated and a common valve control for the tubes for limiting or preventing the motion of the pressure medium.

4. A brake for the drive shaft of a motor vehicle or the like comprising a receptacle for a pressure medium, a plurality of tubes extending from said receptacle with their ends arranged radially relative to the shaft, a piston in each tube supporting the pressure medium having an operative connection with the shaft whereby the piston is reciprocated when the shaft is rotated and a common valve control for the tubes for limiting or preventing the motion of the pressure medium, said control comprising a sliding valve disposed in the bottom of the receptacle adapted to engage all the tubes simultaneously.

5. A brake for the drive shaft of a motor vehicle or the like comprising a receptacle for a pressure medium, a plurality of tubes extending from said receptacle with their ends arranged radially relative to the shaft, a piston in each tube supporting the pressure medium having an operative connection with the shaft whereby the piston is reciprocated when the shaft is rotated and a common valve control for the tubes for limiting or preventing the motion of the pressure medium, said control comprising a sliding valve disposed in the bottom of the receptacle adapted to engage all the tubes simultaneously, and a foot pedal operatively connected therewith for actuating the same.

6. A valve control for a device of the character described comprising a horizontal rod operatively associated with the valve, a sector pivotally supported at its apex having an extension beyond its support extending into the path of the rod and spring means for normally holding the sector in a neutral position, the latter being adapted to be rendered active by foot pressure.

7. A controlling device for two valves disposed at a distance from one another comprising two rods operatively associated with the valves supported in longitudinal alinement so as to leave a gap between the same, a sector pivotally supported over said gap having an arm extending into the gap and yielding means for normally holding the sector in an inactive position, the rods being adapted to be moved longitudinally by the arm when the sector is rocked forwardly or rearwardly respectively.

FLOYD H. RICKER.